June 26, 1956  W. C. PARRISH  2,751,758
VEHICLE AIR CONDITIONER
Filed June 15, 1953  2 Sheets-Sheet 1
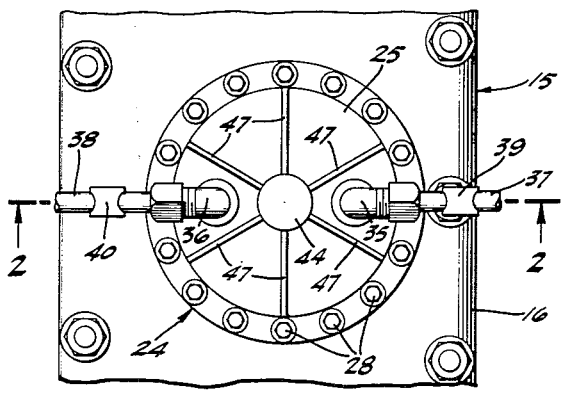
FIG. 1.
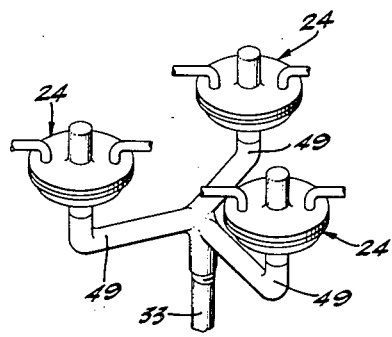
FIG. 3.
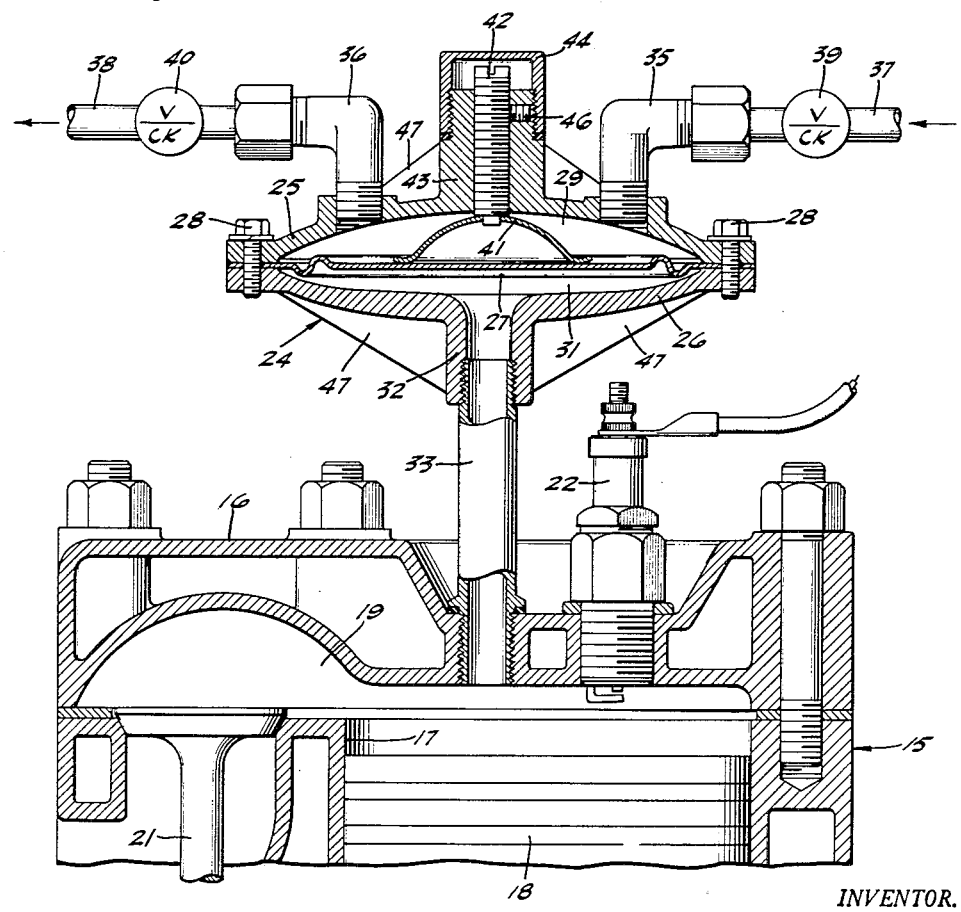
FIG. 2.
INVENTOR.
WILLIAM C. PARRISH
BY
ATTORNEY June 26, 1956 W. C. PARRISH 2,751,758
VEHICLE AIR CONDITIONER
Filed June 15, 1953 2 Sheets-Sheet 2

INVENTOR.
WILLIAM C. PARRISH
BY
ATTORNEY

United States Patent Office 2,751,758
Patented June 26, 1956

2,751,758

VEHICLE AIR CONDITIONER

William C. Parrish, Puente, Calif.

Application June 15, 1953, Serial No. 361,491

3 Claims. (Cl. 62—117.1)

This invention relates to a vehicle air conditioner, and particularly to an apparatus adapted to either heat or cool any land, sea or air vehicle powered by an internal combustion engine.

In designing apparatus for cooling automobiles and other vehicles, it is conventional to utilize either an electric battery or a driven component of the vehicle engine as a source of power for the compressor employed in the cooling system. The use of batteries is highly undesirable because of their bulk and weight, and also because of the necessity for frequent battery recharging and replacement. Where a driven component of the engine is employed, for example where the compressor is mechanically connected to the crankshaft of an automobile, it is apparent that the amount of power taken by the compressor is subtracted from the amount of power transmitted from the engine to the wheels. The resulting power loss in such systems is even more damaging because it is subtracted from the brake horsepower of the engine instead of from the indicated horsepower, the brake horsepower being substantially less than the indicated horsepower because of the friction, etc. in the various intermediate elements such as the pistons, connecting rods, etc. Not only does a compressor connected to a motor-driven element such as an automobile crankshaft materially decrease the useful work transmitted to the wheels, but it is evident that a compressor so driven has no beneficial effect on the internal operation of the engine itself.

In view of the above problems characteristic of vehicle air conditioning systems, it is an object of the present invention to provide a system adapted to either heat or cool a vehicle, the compressor component of the system being powered directly by explosions in the combustion chambers of the internal combustion engine instead of indirectly by a driven element such as a crankshaft.

A further object of the invention is to provide a compressor associated with an internal combustion engine in such a way as to be operated with little or no drain of power from the engine, and which improves the operation of the engine by minimizing or eliminating detonation.

A further object of the invention is to provide an automobile air conditioning system which is easily adapted for operation as a refrigerating means in summer and as a heat pump in winter, and which, when operating as a heat pump, may utilize alternative sources of heat in accordance with atmospheric conditions.

These and other objects and advantages of the invention will be set forth more fully in the following specification and claims considered in connection with the attached drawings to which they relate.

In the drawings:

Figure 1 is a top plan view illustrating a compressor element of the invention as mounted above the block of an internal combustion engine;

Figure 2 is an enlarged vertical section taken along line 2—2 of Figure 1;

Figure 3 is a perspective schematic view illustrating an alternative compressor element adapted for use on relatively large vehicles such as trucks and buses;

Figure 4:
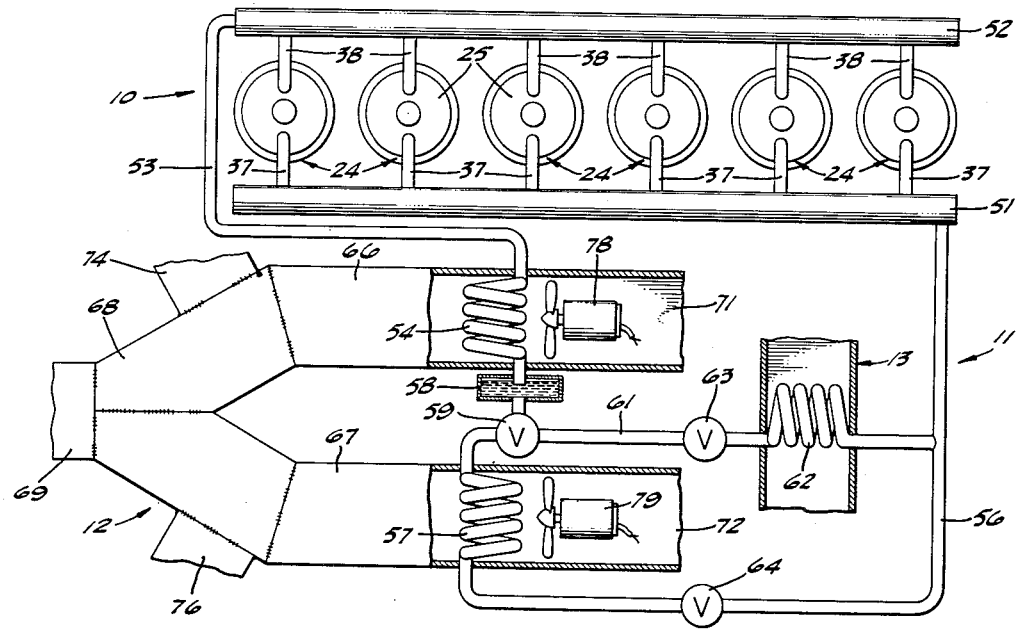
Figure 4 is a diagrammatic view illustrating a heat pump-refrigeration system as employed in connection with the compressor system.

Referring to the drawings, the vehicle air conditioning system is seen to comprise a compressor pump system 10 which forms part of a circuit 11 adapted for use in carrying out either a refrigerating or heat pump cycle. The refrigerating-heat pump circuit 11 is associated with an air duct system 12 adapted to conduct air to and from various portions of an automobile or other vehicle, not shown. In addition to duct system 12, a secondary duct or pipe 13 is illustrated, this duct being adapted for use in injecting heat into the system when the apparatus is used in a heat pump during relatively cold winter weather.

Although the air conditioning system may be employed on any vehicle powered by an internal combustion engine, including engines of the diesel type, it is here illustrated as associated with a conventional six-cylinder automobile engine 15, portions of which are shown in Figures 1 and 2. As best shown in Figure 2, the illustrated engine is of the L-head type comprising a water jacketed head 16 and cylinder 17, the latter having a piston 18 slidably mounted in it for transmission of power to the crankshaft and wheels. The upper end of cylinder 17 communicates with the combustion chamber 19, there being a valve 21 and spark plug 22 associated with combustion chamber 19 in the conventional manner.

In the four-cycle engine, the spark plug 22 is operated every second upstroke of piston 18 to ignite the compressed gas and air in combustion chamber 19 and perform useful work through downward displacement of the piston as a result of the explosion. The fuel ignition is conventionally timed to occur when the piston 18 is at approximately dead center, or the end of its upstroke slightly above the position shown in Figure 2. The essence of the present invention lies in providing a movable pump element in communication with combustion chamber 19 and adapted to be actuated by the peak combustion chamber pressures occurring as a result of the explosion. As will be described in detail subsequently, the association of a pump or compressor element with combustion chamber 19, in the manner indicated, permits useful work to be taken from engine 15 without substantially diminishing the amount of power transmitted to the crank shaft and wheels, and further has the effect of enhancing the operation of the engine through minimization of its tendency to detonate or knock.

Figure 5:
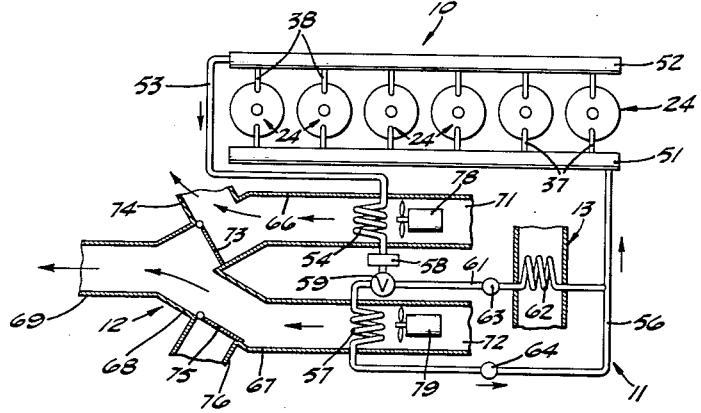
Figure 5 is a diagrammatic view illustrating the system of Figure 4 as adapted for summer or refrigeration operation.
Figure 6:
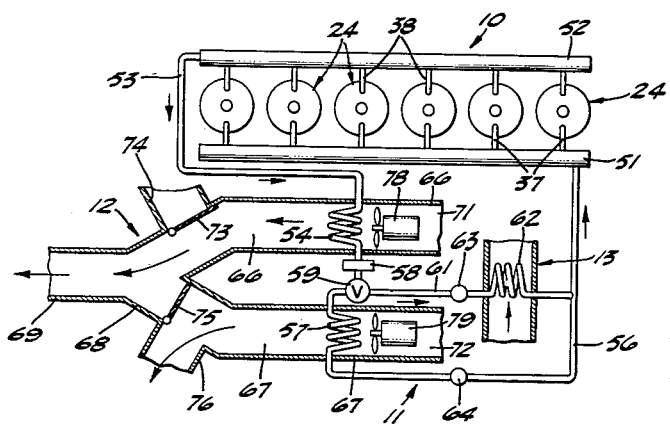
Figure 6 corresponds to Figure 5 but illustrates the system as adapted for one form of winter or heating operation.

The compressor pump units associated one with each combustion chamber 19 are given the reference character 24, and six of them are adapted to make up the compressor pump system 10 shown in Figures 4, 5 and 6. Referring to Figure 2, each of the compressor units 24 is illustrated as a diaphragm pump, and comprises upper and lower disc-shaped casing components 25 and 26 separated by a suitable diaphragm 27, these elements being associated by means of arcuately spaced screws 28. Upper casing 25 is upwardly dished to form, together with diaphragm 27, a chamber 29 for the refrigerant or heating fluid of the refrigerating-heat pump circuit 11. Lower casing element 26, on the other hand, is downwardly dished to form a chamber 31 adapted to receive combustion products from the engine combustion chamber 19. For this purpose the lower casing 26 is formed with a throat 32 threaded over the upper end of a vertical nipple 33, the lower end of the nipple being threaded downwardly through head 16 and into communication with the combustion chamber. The combustion products thus may pass upwardly through nipple 33 to combustion products chamber 31 for upward flexing of diaphragm 27 at the peak pressure portion of an explosion. The diaphragm is here defined as a movable wall, although the movement is by flexing or bending instead of by displacement alone.

The upper or refrigerant casing 25 is provided with suitable fittings 35 and 36 connected, respectively, to inlet and outlet refrigerant pipes 37 and 38. A check valve 39 in inlet pipe 37 permits passage of fluid only in the direction of the unit 24, while a check valve 40 in pipe 38 is adapted to permit only outward passage of the fluid. In order to regulate the pressure at which diaphragm 27 is moved to pump and compress fluid in chamber 29, a suitable dome or U-shaped spring 41 is provided on the upper surface of the diaphragm, and a vertical adjustment screw 42, associated with the spring, is threaded through a cylindrical boss 43 on upper casing 25. Screw 42 is sealed and protected by a cap 44 on boss 43, and is locked in position by a set screw 46, both of these elements being removed or loosened when it is desired to rotate the screw to vary the amount of spring pressure on diaphragm 27.

In the operation of the compressor of pump unit 24, the refrigerant, such as Freon–12 (dichlorodifluoromethane), is admitted from pipe 37 through one-way valve 38 and into pump chamber 29, where it is compressed upon upward flexing of diaphragm 27 during the next explosion in the combustion chamber 19. The compressed fluid is forced out through check valve 40 and into outlet pipe 38 for use in the circuit 11 as will be described.

It is a feature of the invention that the combustion products contained in chamber 31 and the nipple 33 have a relatively small volume, and the combustion chamber 19 of the automobile is also of small volume as compared to conventional combustion chambers. Preferably, the combined volume of chamber 19, nipple 33, and chamber 31 is substantially the same as the combustion chamber volume of the conventional automobile, the compression ratio of the engine then being unaffected by the addition of pump-compressor units 24. The nipple and combustion products chambers may thus be regarded as forming part of the combustion chamber itself.

The use of a relatively small diameter nipple 33 is desirable in order to prevent an excessive flow of combustion products between chambers 19 and 31. Instead, the moving of diaphragm wall 27 is effected by a pressure wave traveling through the gases as distinguished from any constant transfer of combustion products into the chamber 31. It follows that the amount of heating of unit 24 effected by circulation of hot gases upwardly through nipple 33 will be minimized as compared to structures in which the diameter of nipple 33 is large. Radial fins 47 are provided on both of the casing components 25 and 26 in order to further aid in the minimization of any heating of the pump components and refrigerant fluid.

The adjustment screw 42 and spring 41 are set to prevent flexing of diaphragm 27 except during an explosion in combustion chamber 19 and when the combustion chamber pressure is approaching its peak. With such a spring setting, the compression ratio of the engine will be constant during the compression and expansion strokes of piston 18, and little or no work will be subtracted from that to be transmitted to the wheels.

To illustrate the above, let it be assumed that the engine 15 is one in which the normal explosion pressure in combustion chamber 19 is approximately six hundred p. s. i., the compression pressure prior to the explosion being on the order one hundred twenty-five p. s. i. The adjustment screw 42 and spring 41 are then adjusted to prevent flexing of diaphragm 27 until the pressure in chamber 31 is on the order of four hundred p. s. i. As the piston 18 moves upwardly in cylinder 17 during the compression stroke, the diaphragm 27 remains stationary and the compression ratio of the motor is in no way diminished. When the piston is approximately at dead center, at the upper end of cylinder 17, spark plug 22 ignites the compressed fuel-air mixture and produces an explosion. During the peak of the explosion, when the piston 18 is at approximately dead center, diaphragm 27 momentarily flexes to compress the refrigerant, increasing the combined colume of chambers 19 and 31 and nipple 33. Because the interval of flexing of diaphragm 27 is extremely brief, the combined volume of the combustion chamber and of the nipple 33 and chamber 31 is returned to normal by the time piston 18 starts its downward or power stroke. No useful work, which would otherwise be delivered through piston 18 to the drive shaft, is taken from the engine since the diaphragm only flexes when the piston is at approximaetly dead center. Stated otherwise, the diaphragm flexing only operates to cut off the peak of the pressure-volume or indicator diagram of the engine. Since this peak is of extremely small area, and since the area represents the work transmitted to the piston 18, it follows that little or no useful work is taken from the engine. However, the momentary flexing of diaphragm 27 is adequate to substantially compress the refrigerant or heating fluid in the system. For example, the outlet pressure in pipe 38 may be on the order of one hundred eighty p. s. i. where the inlet pressure from pipe 37 is sixty p. s. i.

Not only does the flexing of diaphragm 27 compress the refrigerant fluid in the air conditioning system, but it has the effect of reducing or preventing detonation effects in the engine 15. When detonation or "knocking" occurs, the peak pressure in combustion chamber 19 may be on the order of eight hundred to one thousand p. s. i. instead of the normal pressure of approximately six hundred p. s. i. Since this greatly increased peak occurs during an explosion when the piston 18 is approximately at dead center, it has the effect of creating a very large load on the crankshaft bearing as well as on the valve and other components of the engine, and furthermore results in undesirable "knocking" as well as in loss of efficiency. Should a tendency toward detonation occur in the engine 15, diaphragm 27 will deflect a substantial amount and materially increase the combined volume of chambers 19 and 31 and nipple 33. The effective volume of the combustion chamber being increased, it follows that the exploding gases will have more room for expansion and that the pre-detonation pressure will be materially reduced, with less tendency to create detonation and therefore with reduction or elimination of undesirable noises, bearing loads, etc. The use of a unit such as unit 24 therefore provides the combined beneficial effects of compressing a refrigerant or heating fluid without substantial decrease in work transmitted from the engine to the drive wheels, and also of eliminating or materially reducing undesirable detonation.

It is to be understood that the spring 41 and the refrigerant pressure in chamber 29 do not comprise the entire resistance to the motion of diaphragm 27. The inertia of diaphragm 27 and spring 41 acts effectively to resist the combustion pressure applied to the underside of diaphragm 27 until this pressure has built up to a point overcoming both spring pressure and inertia. Thus the spring rate of spring 41 can be quite low as compared to a static load of four hundred p. s. i. on diaphragm 27.

Referring to Figure 3, a modified element is shown which utilizes three units 24 for each cylinder of the vehicle, these units communicating through pipes 49 with the single nipple 33. The system of Figure 3 is particularly useful in large vehicles such as trucks and buses, since it permits use of refrigeration systems having greater capacity. It is evident that instead of using more than one unit 24 for each cylinder of the internal combustion engine, it is within the scope of the invention to provide only one or two units 24 for a six or eight cylinder engine, and that various other modifications and combinations of the unit may be utilized. For example, with regard to the internal workings of each unit 24, a bellows or other flexible wall element could be employed in place of a diaphragm, and insulating oil could be used to prevent conduction of heat from the engine to the refrigerant. Furthermore, other modifications in the exact structure of the unit 24 may be employed without altering the invention, the essence of which is the deflection or shifting of a movable element through application of peak explosion pressures created in the combustion chamber 19.

Referring to Figures 4, 5 and 6, the connection of compressor or pump units 24 into the compressor system 10 is formed by connecting all of the inlet pipes 37 to an inlet header 51, and all of the outlet pipes 38 to an outlet header 52. The headers 51 and 52 are connected into the refrigerating and heat pump circuit 11 by means of a pipe or tube 53 connected from outlet header 52 to a condenser coil 54, and a pipe or tube 56 connected from inlet head 51 to a cooling coil 57. Between condenser coil 54 and cooling coil 57 are a receiving tank or chamber 58 and a suitable expansion valve 59. Expansion valve 59 has a second outlet, in addition to the one leading to cooling coil 57, and which connects through a pipe 61 and a heating coil 62 to the pipe 56. A suitable shutoff valve 63 is provided in pipe 61 between expansion valve 59 and coil 62, and a second shutoff valve 64 is provided in pipe 56 between the cooling coil 57 and the junction of pipes 61 and 56.

The air duct system 12 comprises a pair of ducts 66 and 67 which merge through a Y-shaped connecting duct 68 into a common duct 69 leading to the body or passenger chamber of the automobile to be air conditioned. The duct 66 encloses condenser coil 54 and connects at its end 71, remote from common duct 69, to a conduit, not shown, adapted to conduct air from the automobile body or from the outside or both. Duct 67, on the other hand, connects at its end 72 to an unshown conduit bringing in fresh atmospheric air or air from the automobile body, this air passing over the cooling coil 57 which is enclosed in the duct. Referring to Figures 5 and 6, each arm of Y duct 68 is provided with an overboard duct leading to the atmosphere and with a suitable flap valve adapted to direct air to the atmosphere instead of to common duct 69. Thus the flap valve 73 is adapted to by-pass air from duct 66 into an overboard duct 74, while a corresponding flap valve 75 may serve to by-pass air from duct 67 out a second overboard duct 76. Suitable fans 78 and 79 may be provided, respectively, in ducts 66 and 67 to aid in impelling air toward the common duct 69.

The secondary duct or pipe 13 encloses the heating coil 62 and may be adapted to conduct any hot fluid naturally present in the automobile. Preferably, the duct 13 contains exhaust gas from engine 15, but it may be incorporated in the engine lubricating or cooling system if desired.

Referring to Figure 5, the system is illustrated as adapted for one form of summer or air-cooling operation. This is effected by turning flap valve 73 until it blocks duct 66, return air from the automobile body then passing out the overboard duct 74. Flap valve 75, on the other hand, is turned until it blocks overboard duct 76, and fresh atmospheric air is passed through duct 67 and common duct 69 to the automobile body. In addition, the shutoff valve 63 is closed and shutoff valve 64 opened, the pipe 61 and heating coil 62 performing no function in the summer operating cycle.

The system is then employed as a refrigerating system or cycle in the following manner. The Freon or other suitable refrigerant is compressed in compressor units 24 and passed into outlet header 52 from which it flows through pipe 53 and into condenser 54. Heat from the refrigerant is conducted through the wall of the cooling tube or condenser 54 and absorbed by the air passing through duct 66 and out overboard duct 74, with the fan 78 being employed if necessary. The refrigerant is thus cooled and changes into a liquid state before passing into the receiver 58. From receiver 58 the liquid refrigerant expands through expansion valve 59 and into cooling coil 57, the valve 63 being closed at this time. Coil 57 is then made very cold and takes heat from the fresh air passing through duct 67 and duct 69 into the car. The air passing into the car is thus made relatively cold and serves as a cooling medium. The expanded refrigerant in cooling coil 57 is vaporized by the heat taken from the air and passes through the open valve 64 and the pipe 56 to inlet header 51 and compressor pumps 24, the refrigeration cycle then being complete. The system thus operates to take relatively warm air from the car and deliver fresh cold air thereto.

Referring to Figure 6, the system is adapted for relatively mild winter weather by merely shifting both of the flap valves 73 and 75, the overboard duct 74 then being blocked and the overboard duct 76 being utilized. When the system is thus employed, the relatively warm air from the body of the automobile, with some make up air, is passed through duct 66 and over condenser coil 54 where it picks up heat. It is then transmitted into common duct 69 and back into the car to warm its occupants. The outside or atmospheric air in duct 67 transfers a certain amount of heat to the fluid in coil 57, which is at this time relatively cold due to its expansion through valve 59. The system then operates as a reverse cycle or heat pump, with heat being withdrawn from condenser 54 for delivery to the body of the automobile, and heat being transferred into coil 57 by the atmospheric air in duct 67. The air in duct 67 is, although at a mild winter temperature, substantially warmer than coil 57.

For extremely cold weather operation, the amount of heat transferred from the outside air to the fluid in coil 57 may be insufficient to result in a heating of coil 54 adequately to sufficiently warm the automobile occupants. For such operation, the system of Figure 6 is employed except that shutoff valve 63 is opened and valve 64 closed. The heat pump cycle then includes coil 62 instead of coil 57, the coil 62 being relatively hot due to passage of exhaust gas, lubricating oil, etc. through the duct or pipe 13. In this manner, a quantity of heat is delivered to the system which is substantially greater than that provided by the atmospheric air acting on coil 57, so that upon subsequent compression of the operating fluid its temperature is raised, as is that of coil 54, until the air passing through duct 66 is sufficiently hot to adequately warm the automobile.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An automobile air conditioning system, which comprises a plurality of flexible-wall pumps in continuous communication with the combustion chambers of the engine of said automobile, a heat pump-refrigerating circuit interconnected with said pumps, said circuit including a first heat transfer element on the high pressure side of said pumps, a second heat transfer element on the low pressure side of said pumps, an expansion valve between said heat transfer elements, and first and second duct means to continuously direct air over said first and second heat transfer elements, said first and second duct means discharging selectively overboard and into said automobile depending upon whether it is desired to heat or cool the same.

2. The invention as claimed in claim 1, wherein said flexible-wall pumps are diaphragm pumps.

3. An automobile air conditioning system, which comprises a plurality of flexible-wall pumps in continuous communication with the combustion chambers of the engine of said automobile; a heat pump-refrigerating circuit interconnected with said pumps, said circuit including a first heat transfer element on the high pressure side of said pumps, a second heat transfer element on the low pressure side of said pumps, an expansion valve between said heat transfer elements, and duct means to selectively direct air over said first or second heat transfer elements and into said vehicle to heat or cool the same; a third heat transfer element provided in contact with a hot fluid naturally present in said automobile engine; and valve means to by-pass said second heat transfer element and connect said third heat transfer element in said circuit, whereby additional heat is injected into said circuit through heating of said third heat transfer element to a relatively high temperature.

References Cited in the file of this patent

UNITED STATES PATENTS

| | | |
|---|---|---|
| 862,867 | Eggleston | Aug. 6, 1907 |
| 1,657,641 | Pescara | Jan. 31, 1928 |
| 2,384,770 | Ruth | Sept. 11, 1945 |
| 2,401,890 | Smith | June 11, 1946 |
| 2,546,965 | Bodine | Apr. 3, 1951 |

FOREIGN PATENTS

| | | |
|---|---|---|
| 440,334 | France | May 2, 1912 |
| 494,309 | Great Britain | Oct. 24, 1938 |
| 551,314 | France | Apr. 3, 1923 |